(12) United States Patent
Nakagomi et al.

(10) Patent No.: US 8,185,968 B2
(45) Date of Patent: May 22, 2012

(54) MAGNETIC HEAD INSPECTION METHOD AND MAGNETIC HEAD MANUFACTURING METHOD

(75) Inventors: Tsuneo Nakagomi, Saitama (JP); Norimitsu Matsusita, Saitama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/024,589

(22) Filed: Feb. 10, 2011

(65) Prior Publication Data

US 2011/0225684 A1 Sep. 15, 2011

(30) Foreign Application Priority Data

Mar. 9, 2010 (JP) .................................. 2010-051532

(51) Int. Cl.
- *G01Q 60/50* (2010.01)
- *G01Q 60/56* (2010.01)
- *G01N 13/22* (2006.01)
- *G01N 13/16* (2006.01)

(52) U.S. Cl. .............. 850/46; 850/33; 850/63; 428/810; 428/815.1; 428/848.9; 73/105

(58) Field of Classification Search ............... 850/33, 850/46, 63; 73/105; 428/810, 815.1, 848.9
See application file for complete search history.

(56) References Cited

U.S. PATENT DOCUMENTS

| | | | | |
|---|---|---|---|---|
| 5,898,106 A | * | 4/1999 | Babcock et al. | 73/105 |
| 6,552,339 B1 | * | 4/2003 | Gupta et al. | 850/63 |
| 7,727,645 B2 | * | 6/2010 | Fukushima et al. | 428/846.9 |

FOREIGN PATENT DOCUMENTS

| | | |
|---|---|---|
| JP | 2003-248911 | 9/2003 |
| JP | 2009-230845 | 10/2009 |

* cited by examiner

*Primary Examiner* — Nikita Wells
(74) *Attorney, Agent, or Firm* — J.C. Patents (57) ABSTRACT

A magnetic head inspection method is provided with the step that an area smaller than a half of a scanning and measurement area of a magnetic probe in a cantilever unit of the MFM is set as a scanning and measurement area on a surface of a recording portion of the magnetic head that is scanned by the AFM, so as to greatly reduce the inspection time (tact time) of the AFM.

8 Claims, 7 Drawing Sheets

FIG.7

MAGNETIC HEAD INSPECTION METHOD AND MAGNETIC HEAD MANUFACTURING METHOD

CROSS-REFERENCE TO RELATED APPLICATION

This application claims the priority benefit of Japan application serial no. 2010-051532, filed on Mar. 9, 2010. The entirety of the above-mentioned patent application is hereby incorporated by reference herein and made a part of specification.

BACKGROUND OF THE INVENTION

1. Field of the Invention

The present invention generally relates to a magnetic head inspection method and a magnetic head manufacturing method for inspecting a thin-film magnetic head, in particular, to a magnetic head inspection method and a magnetic head manufacturing method capable of inspecting a track width of a thin-film magnetic head that cannot be inspected by an optical microscope.

2. Description of Related Art

In recent years, with the rapid increase of surface recording density of the hard disk drive (HDD), the write track width of a thin-film magnetic head becomes miniaturized, and thus the importance of the technology of accurately inspecting a write track width written onto a magnetic disk by using a write pole (element) included in the thin-film magnetic head continues to increase.

In the past, an optical microscope is employed to measure the shape of the write pole (element) included in the thin-film magnetic head. However, with the miniaturization of the track width, the write track width reaches an optical system resolution limit or is narrower than the optical system resolution. Thus, it is difficult to use the optical microscope to measure the shape of the write pole (element). As a result, a scanning electron microscope (SEM) has been recently adopted to replace the optical microscope for measuring the shape of the write pole (element). However, the measurement performed by using the SEM is a kind of destructive inspection. Moreover, similar to the optical microscope, the SEM only measures the physical shape of the write pole (element), which results in the following problem. That is, it is difficult to measure the correlation with the effective magnetic track width (write track width) actually written onto the magnetic disk. In addition, even if the technology of using an atomic force microscope (AFM) to measure the shape of the write pole (element) is adopted, the same problem as described above may also exist. Recently, a magnetic head measuring device is disclosed in Japanese Patent Laid-Open Publication No. 2003-248911. The magnetic head measuring device is formed in a manner that the magnetic field characteristics, i.e., the magnetic field saturation phenomenon, of a write pole may be observed visually by using a magnetic force microscope (MFM).

When the shape of the magnetic head (write pole) is measured by using the SEM or AFM as in the past, though the physical shape of the write pole (element) can be measured, the effective magnetic track width (write track width) actually written onto the magnetic disk cannot be measured. Therefore, in the past, a head disk dedicated measuring device called a spin stand is employed to inspect the write track width in a state after the magnetic head is integrated with a suspension (i.e., a head-gimbal assembly (HGA) state) or in a simulated HGA state.

However, if the inspection with the spin stand is not performed in a final process of magnetic head manufacturing in an HGA state or a simulated HGA state, the inspection of the write track width cannot be implemented. Thus, the inspection with the spin stand is not ideal for improving the productivity or dealing with the requirement for an early feedback in the manufacturing process.

Therefore, the Applicant proposes Japanese Patent Laid-Open Publication No. 2009-230845, which disclosed a magnetic head inspection method and device disclosed in Patent Document 2. The magnetic head inspection method and device may inspect the write track width of the magnetic head in an early phase of the manufacturing process. As for the magnetic head inspection method and device, a recording signal (excitation signal) is input from a bonding pad to a thin-film magnetic head in a row-bar state, and a magnetic field generated by a write pole (element) included in the thin-film magnetic head is observed directly by using an MFM that scans and moves at a position away by a distance equivalent to a flying height of the magnetic head. In this manner, the shape of the magnetic field generated by the write pole (element) instead of the physical shape of the write pole (element) is measured; thus, a non-destructive inspection can be performed on the effective magnetic track width.

Figure 1:
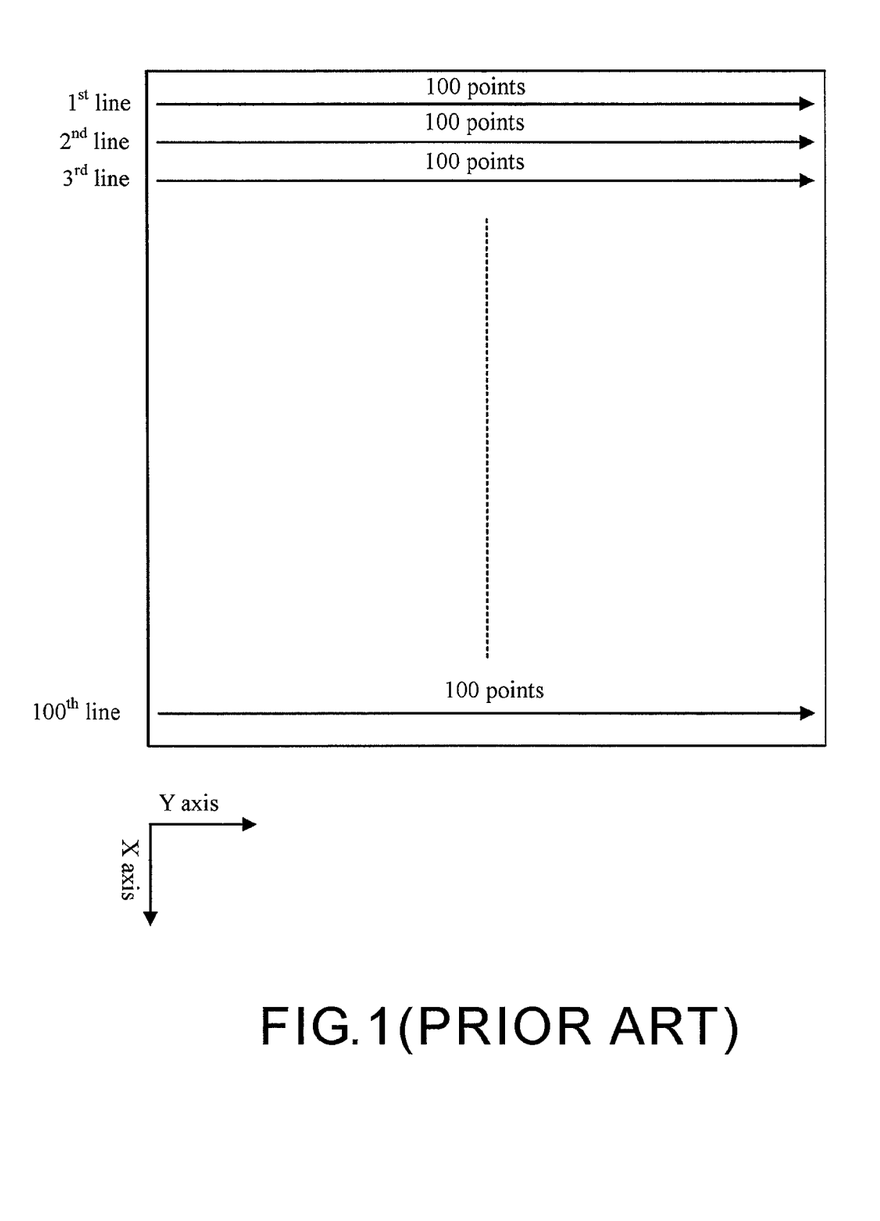
FIG. 1 is a schematic view of measuring a surface shape (concave-convex image) of the entire scanning area.

FIG. 1 is a diagram illustrating a scanning mode of the magnetic head inspection method and device disclosed in Japanese Patent Laid-Open Publication No. 2009-230845 when inspecting the effective track width of the magnetic head. When the MFM is used to scan an inspection area, the inspection area is divided into 100 lines×100 points, and the AFM is used to scan each point, so as to measure (by scanning) a surface shape (concave-convex image) of each point. The reason is that, an image filtering process is performed on a stereo surface shape of the inspection area obtained by the AFM to remove the particles, the height of a front end of a cantilever (an inspection probe) is controlled to make the front end of the cantilever at a position of a fixed height that is away from the thin-film magnetic head in the row-bar state by a distance equivalent to the flying height of the magnetic head, and meanwhile the MFM is used for scanning and observation.

However, it takes time to scan the inspection area with the AFM, and the whole tact time is hard to be reduced. In addition, the following problem also exists, that is, affected by the distance change due to the thermal drift resulting from the temperature change, or the distance change caused by the creep of an actuator of a piezoelectric element, when the MFM is used for scanning, the height of the front end of the cantilever will change.

SUMMARY OF THE INVENTION

Accordingly, the present invention provides a magnetic head inspection method and a magnetic head manufacturing method, to significantly reduce the inspection time (tact time) of an atomic force microscope (AFM), and maintain the height of an inspection probe, so as to perform inspection accurately and rapidly by using a magnetic force microscope (MFM), a scanning Hall probe microscope (SHPM), or a scanning magneto resistance effect microscope (SMRM).

According to one aspect of the present invention, a magnetic head inspection and scanning method are provided, wherein a surface shape of a recording portion of a magnetic head in a row-bar state diced from a wafer is scanned and measured by using an AFM, and based on the measurement result, in a state of maintaining a magnetic probe in a cantilever unit of an MFM at a position away from the surface of the recording portion of the magnetic head by a distance equivalent to a flying height of the magnetic head relative to a magnetic disk, the magnetic probe is enabled to scan and move along a surface of a write pole portion of the magnetic head, so as to detect a signal representing an oscillation state of the cantilever unit, and measure an effective track width of the magnetic head based on the signal. In the magnetic head inspection method, an area smaller than a half of a scanning and measurement area of the magnetic probe in the cantilever unit of the MFM is set as a scanning and measurement area on the surface of the recording portion of the magnetic head that is scanned by the AFM.

When the MFM is used to measure the effective track width, in order to maintain a fixed distance between the cantilever unit and the surface of the recording portion of the magnetic head, the AFM is used in advance to measure the surface shape (concave-convex image) of the recording portion of the magnetic head, and based on the surface shape (concave-convex image), a position of measuring and scanning the effective track width by using the MFM is calculated, that is, a position away by a distance equivalent to the flying height of the magnetic head is calculated. For example, when the scanning area is 100 points×100 points when the effective track width is measured by using the MFM, the AFM is generally used to scan and measure the whole points (10000 points), to obtain the surface shape of the recording portion of the magnetic head. The inventors of this application found from experiments that in calculating the flying height of the magnetic head, it does not need to measure the surface shape of all the points. Since the media surface for the write operation is flat, and the scanning surface of the MFM is also flat, to calculate the position away by a distance equivalent to the flying height of the magnetic head, the surface shape of a line of an area along an X axis and a Y axis is respectively scanned by using the AFM, so as to calculate a slope of the surface shape. Therefore, based on the above calculation result, it is determined to use the MFM to calculate the flying height of the magnetic head when measuring its effective track width. In this case, an area smaller than a half of the scanning and measurement area of the magnetic probe in the cantilever unit of the MFM is set as a scanning and measurement area on the surface of the recording portion of the magnetic head that is scanned by the AFM, thereby significantly reducing the inspection time (tact time) of the AFM, and maintaining the height of the inspection probe, so as to perform inspection accurately and rapidly by using the MFM.

According to another aspect of the present invention, when the scanning and measurement area of the magnetic probe in the cantilever unit of the MFM is rectangular, the scanning and measurement area on the surface of the recording portion of the magnetic head that is scanned by the AFM is set as areas on two sides adjacent to the rectangular area.

Figure 4:
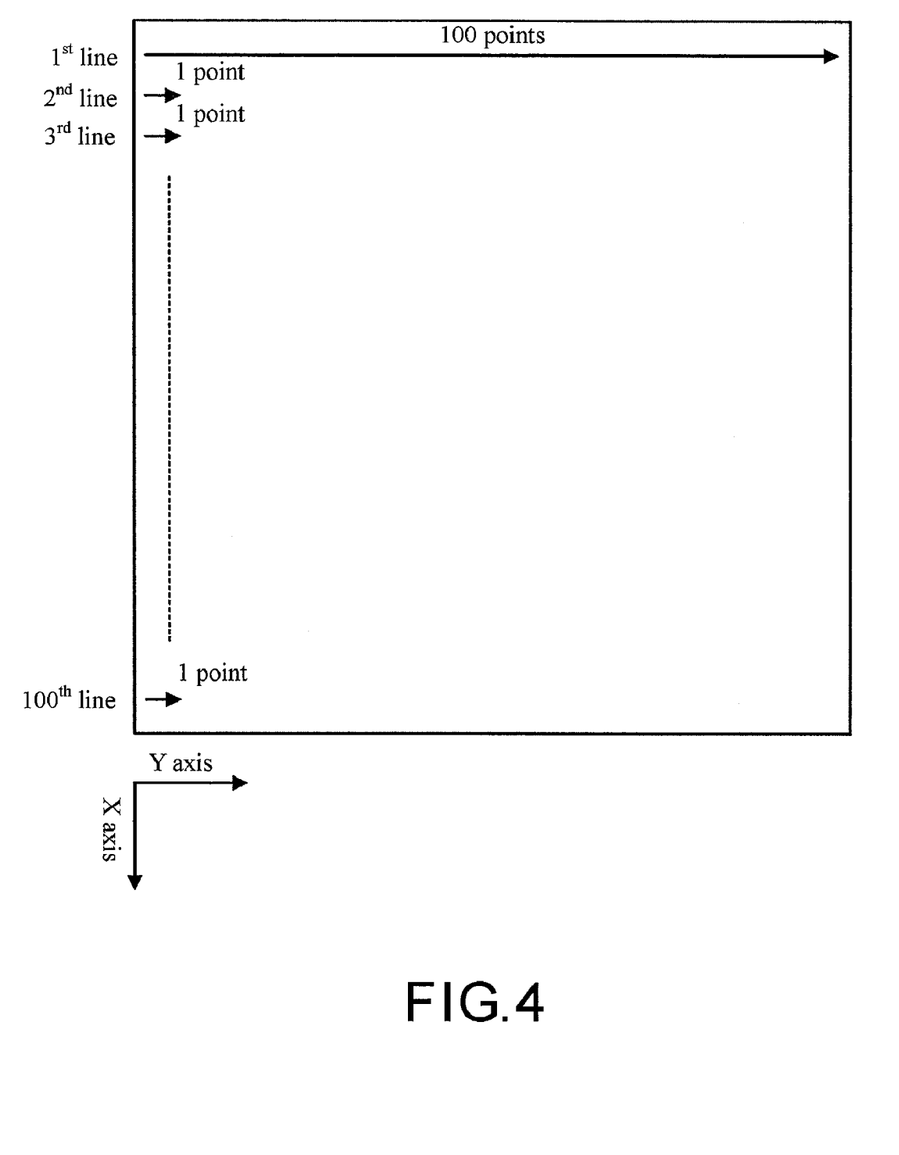
FIG. 4 is a schematic view of measuring a surface shape (tilting image) of a line along an X axis and a Y axis respectively.

When the surface shape (height) of the areas on two sides adjacent to the rectangular scanning and measurement area is measured, as shown in FIG. 4, the surface shape (height) of the area in the first line (on one side of the rectangular area) along the Y axis direction is measured, and then only the surface shape (height) of a front end portion of each line after the second line is measured. Thereby, after the surface shape (height) of a line of an area along the Y axis direction and the surface shape (height) of a line of an area along the X axis direction adjacent to the line of the area along the Y axis direction are measured, the MFM is used for performing inspection. In this manner, the influence of the distance change due to the thermal drift resulting from the temperature change, or the distance change caused by the creep of an actuator of a piezoelectric element is lowered, and a more accurate inspection is achieved.

Further according to one aspect of the present invention, a magnetic head inspection and scanning method are provided, wherein a surface shape of a recording portion of a magnetic head in a row-bar state diced from a wafer is scanned and measured by using an AFM, and based on the measurement result, in a state of maintaining a Hall element or a magneto resistance (MR) element disposed on a cantilever unit of the AFM at a position away from the surface of the recording portion of the magnetic head by a distance equivalent to a flying height of the magnetic head relative to a magnetic disk, the Hall element or the MR element is enabled to scan and move along a surface of a write pole portion of the magnetic head, so as to detect a signal from the Hall element or the MR element, and measure an effective track width of the magnetic head based on the signal. In the magnetic head inspection method, an area smaller than a half of a scanning and measurement area of the Hall element or the MR element is set as a scanning and measurement area on the surface of the recording portion of the magnetic head that is scanned by the AFM. A magnetic field generated by the write pole (element) included in the thin-film magnetic head is observed directly by using the Hall element or the MR element disposed on the cantilever unit of the AFM that scans and moves at a position away by a distance equivalent to the flying height of the magnetic head.

According to further another aspect of the present invention, when the scanning and measurement area of the Hall element or the MR element is rectangular, the scanning and measurement area on the surface of the recording portion of the magnetic head that is scanned by the AFM is set as areas on two sides adjacent to the rectangular area. Similar to the above magnetic head inspection method, after the surface shape (height) of a line of an area along the Y axis direction and the surface shape (height) of a line of an area along the X axis direction adjacent to the line of the area along the Y axis direction are measured, the Hall element or the MR element is used for performing inspection.

A magnetic head manufacturing method of the present invention is characterized in that, a magnetic head is manufactured by using the magnetic head inspection method mentioned above. That is, the magnetic head is manufactured by using any one of the foregoing magnetic head inspection methods.

Effect of the Invention

The present invention has the following effects. The inspection time (tact time) of the AFM is significantly reduced, and the height of the inspection probe is maintained, so as to perform inspection accurately and rapidly by using the MFM, the SHPM, or the SMRM.

The above descriptions are merely a brief introduction of the technical solutions of the present invention. In order to better understand the technical means of the present invention and implement according to the content of the specification, embodiments of the present invention are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3(A) and FIG. 3(B) are schematic views illustrating an inspection of the magnetic head inspection device in FIG. 2, in which

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2:
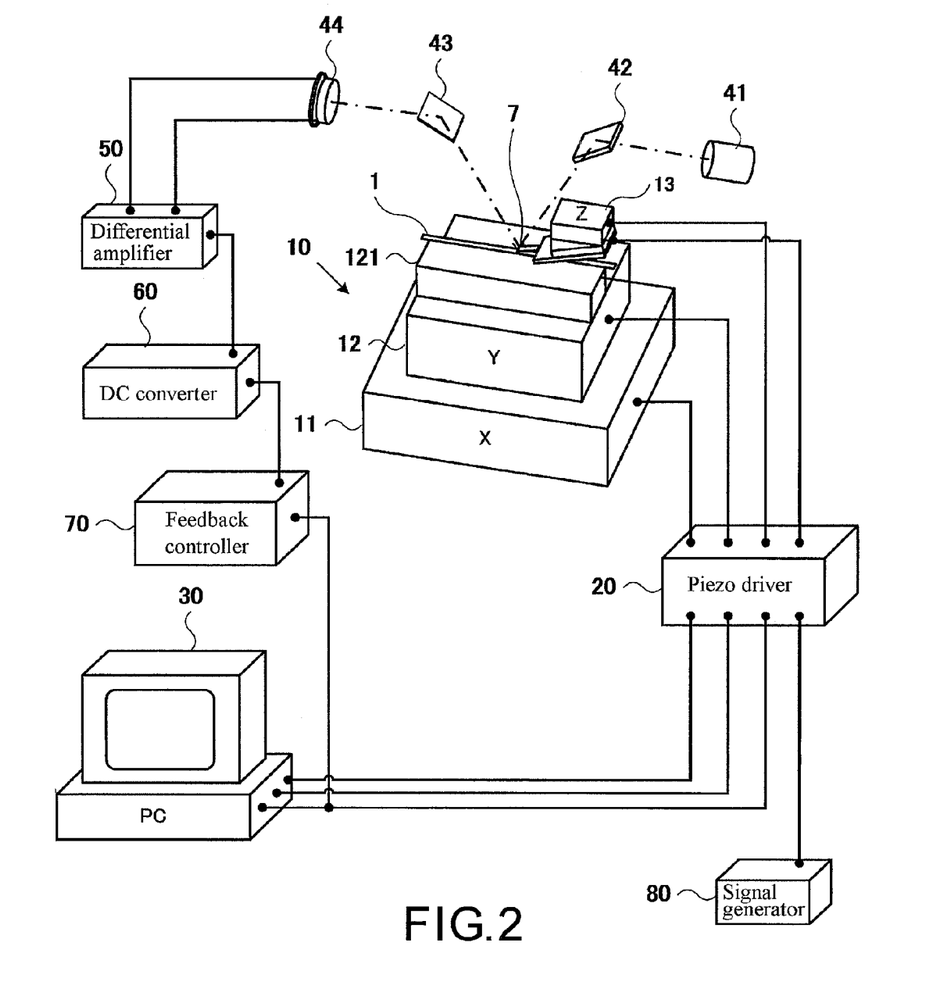
FIG. 2 is a schematic view of a magnetic head inspection device according to an embodiment of the present invention.

FIG. 2 is a schematic view of a magnetic head inspection device according to an embodiment of the present invention. In the magnetic head inspection device in FIG. 2, the effective track width of an MR magnetic head, a giant magneto resistive (GMR) magnetic head, a tunneling magneto resistive (TMR) magnetic head, and the like (referred to as an MR magnetic head below) can be measured in a row-bar (a block formed by an arrangement of head sliders) state prior to the dicing process of obtaining the individual sliders (or chips).

Generally, the row-bar is an elongated block of around 3 cm to 5 cm diced from a wafer. That is, one row-bar is composed of about 40 to 60 head sliders. In the magnetic head inspection device of this embodiment, the prescribed inspection is performed on the row-bar 1 as a work piece. Generally, around 20 to 30 row-bars 1 are provided in a tray, and the row-bars 1 are arranged at a fixed interval in a minor axis direction. A handling robot (not shown) fetches the row-bars 1 one by one from the tray (not shown) and delivers the row-bars 1 onto an inspection stage 10. The row-bars 1 delivered onto the inspection stage 10 are inspected in the following manner.

The inspection stage 10 is formed by an X stage 11 and a Y stage 12 capable of enabling the row-bars 1 to move in the X and Y directions. The row-bar 1 is positioned by making temporary contact of a single side surface in a major axis direction to a reference surface of the Y stage 12. A carrier portion 121 for positioning the row-bar 1 is located on top of the Y stage 12. A stepped portion approximately coinciding with the row-bar 1 in shape is located at one side on an upper edge of the carrier portion 121. The row-bar 1 is placed in position by pressing against a bottom surface and a side surface of the stepped portion. A rear surface (opposite to that having connecting terminals for the magnetic head) of the row-bar 1 is pressed against a back surface of the stepped portion. The stepped portion has reference surfaces that are respectively parallel to or orthogonal to the moving direction of the X stage 11 (X axis) and the moving direction of the Z stage 13 (Z axis). Therefore, the row-bar 1 may be accurately positioned in the X and Z directions by placing the row-bar 1 against the bottom surface and the side surface of the stepped portion on the Y stage 12.

Although not shown, a camera for measuring position offset is located above the Y stage 12. The Z stage 13 enables a cantilever portion 7 of an AFM and an MFM to move in the Z direction. The X stage 11, the Y stage 12, and the Z stage 13 of the inspection stage 10 are each composed of piezo stages. When the positioning process is finished, suction holds the row-bar 1 on the carrier portion 121, and a front end of a probe card (not shown) contacts the terminals on the front surface of the row-bar 1. Thereby, the write pole of the magnetic head in the row-bar 1 can be energized through a coil.

A piezo driver 20 performs drive control of the X stage 11, the Y stage 12, and the Z stage 13 (the piezo stages) of the inspection stage 10. The control portion 30 is composed of a control computer that takes the form of a personal computer (PC) including a monitor as its basic configuration. As shown in FIG. 2, the cantilever portion 7 having a sharp magnetic probe at its free end is located at a position above and pointing towards the row-bar 1 carried on the Y stage 12 of the inspection stage 10. The cantilever portion 7 is installed on an oscillator mounted below the Z stage 13. The oscillator is composed of a piezo element with an alternating current (AC) voltage applied at a frequency close to its mechanical resonance frequency via the piezo driver 20, which causes it to vibrate the magnetic probe up and down.

A displacement detection portion includes a semiconductor laser element 41, reflecting mirrors 42 and 43, and a displacement sensor 44 containing a dual-photo detector element. Light emitted from the semiconductor laser element 41 is irradiated onto the cantilever portion 7 after being reflected by the reflecting mirror 42. Light reflected by the cantilever portion 7 is further directed into the displacement sensor 44 after being reflected by the reflecting mirror 43. A differential amplifier 50 implements a specific operation on a differential signal of two signals output from the displacement sensor 44, and outputs the signal to a direct current (DC) converter 60. That is, the differential amplifier 50 outputs a displacement signal corresponding to the difference between the two signals output from the displacement sensor 44 to the DC converter 60. The DC converter 60 is composed of a root mean squared value to direct current (RMS-DC) converter that converts the displacement signal output from the differential amplifier 50 into an effective DC signal value.

The displacement signal output from the differential amplifier 50 is a signal corresponding to a displacement of the cantilever portion 7. Due to the oscillation of the cantilever portion 7, the displacement signal becomes an AC signal. The signal output from the DC converter 60 is output to a feedback controller 70. The feedback controller 70 outputs the signal output from the DC converter 60 as a signal for monitoring the amplitude of oscillation of the cantilever portion 7 to the control portion 30, and outputs the signal output from the DC converter 60 as a control signal for the Z stage 13 to adjust the amplitude of oscillation of the cantilever portion 7 to the piezo driver 20. The control portion 30 monitors the signal and controls the Z stage 13 of the piezo driver 20 according to a value of the signal, in order that an initial position of the cantilever portion 7 can be adjusted before the measurement starts. In this embodiment, the magnetic head flying height of an HDD is set as the initial position of the cantilever portion 7. A signal generator 80 provides an oscillating signal for oscillation of the cantilever portion 7 via the piezo driver 20.

The piezo driver 20 vibrates the cantilever portion 7 at the frequency of the oscillating signal from the signal generator 80.

Figure 3A:
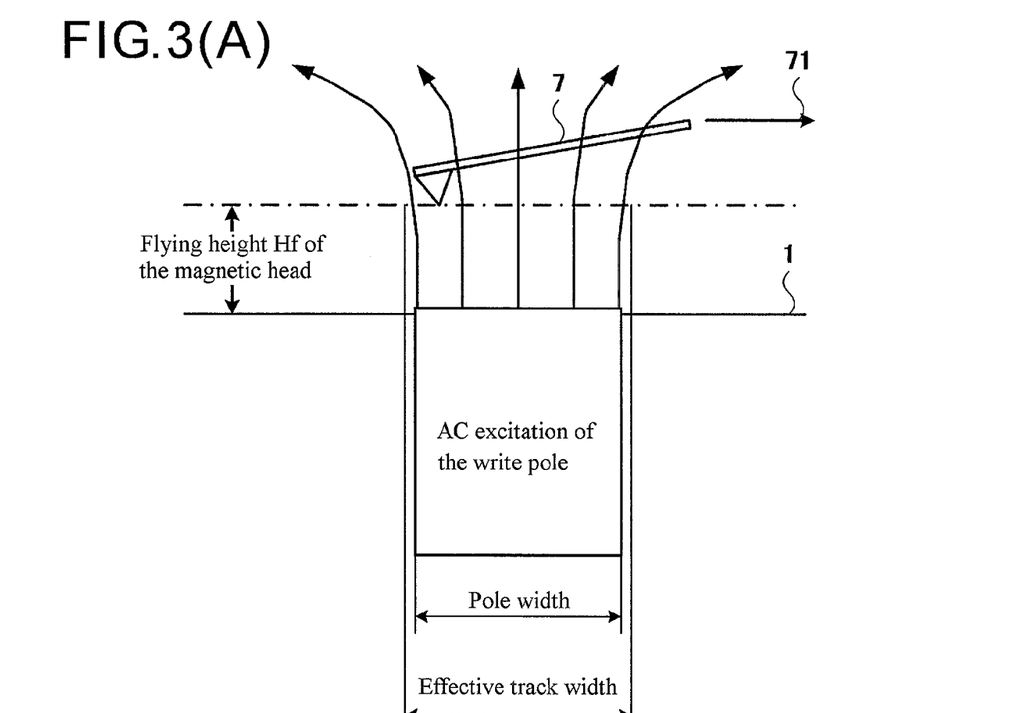
FIG. 3(A) is a schematic view of a construction of a magnetic head portion.
Figure 3B:
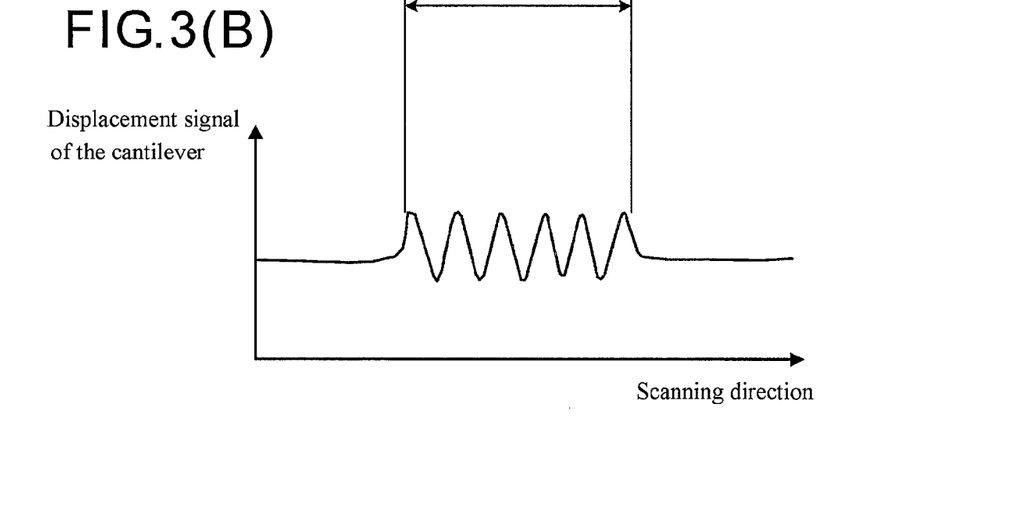
FIG. 3(B) is a view illustrating an example of a displacement signal of a cantilever portion.

FIG. 3(A) and FIG. 3(B) are schematic views illustrating an inspection of the magnetic head inspection device in FIG. 2, in which FIG. 3(A) is a schematic view of a construction of a magnetic head portion, and FIG. 3(B) is a view illustrating an example of a displacement signal of a cantilever portion. As shown in FIG. 3(A) and FIG. 3(B), the cantilever portion 7 is positioned by the Z stage 13, such that the front end portion of the magnetic probe of the cantilever portion 7 is at a height from the surface of the magnetic head in the row-bar 1 equivalent to the flying height Hf of the magnetic head. The cantilever portion 7 scans in a scanning direction 71 relative to the row-bar 1 (magnetic head). In this embodiment, the row-bar 1 moves via the X stage 11 and the Y stage 12.

At this point, the write pole of the magnetic head is undergoing an AC excitation, and thus the cantilever portion 7 is displaced synchronously with the AC excitation. The displacement of the cantilever portion 7 is shown by the displacement signal in FIG. 3(B), and thus an effective track width of the magnetic head can be detected from the displacement signal. Furthermore, the actual pole width of the magnetic head may be measured by performing a normal inspection with the MFM instead of with the AC excitation on the write pole.

In this way, for a conventional MFM, although the actual pole width of the magnetic head can be detected, the effective track width of the write pole of the magnetic head can also be inspected through the AC excitation performed on the write pole of the magnetic head while at the same time through the scanning motion performed by the cantilever portion 7 at the flying height of the magnetic head, thereby achieving inspection of the write track width of the magnetic head in the earliest possible phase of the manufacturing process, as shown in this embodiment.

FIG. 4 is a schematic view of measuring a surface shape (tilting image) of a line along an X axis and a Y axis respectively. In the prior art, as shown in FIG. 1, the AFM is used to measure all the points, that is, 100 points×100 points (10000 points) in the scanning area, so as to obtain the surface shape of a sample. Since the media surface for the write operation is flat, and the scanning surface of the magnetic head for the MFM is also flat, in calculating the flying height of the magnetic head, it does not need to measure the surface shape of all the points.

Therefore, in this embodiment, as shown in FIG. 4, the 100 points in the first line are mainly scanned by the AFM along the Y axis, and the obtained first line information is used as reference for the flying height information of the magnetic head to be measured by the MFM, so as to scan the whole area of the first line with the MFM. For the second line, one point in the second line is mainly scanned by the AFM along the Y axis, and the information of the point in the second line is used as reference for the flying height information of the magnetic head to be measured by the MFM, so as to scan the whole area of the second line with the MFM. After the third line, similar to the operation on the second line, one point is measured by the AFM, the flying height information of the magnetic head is set according to the measurement result of the AFM, and then the MFM starts measurement. That is, for the measurement with the AFM, only one line (100 points) along the Y axis and one line (100 points) at the left side of the X axis are scanned, so as to calculate the tilting image of each line. The tilting image is used as the flying height information of the magnetic head for slope correction or interpolation during the scanning of the MFM, so as to optimize the measurement with the AFM.

Thereby, it only needs to measure about 200 points by the AFM, as compared with the 10000 points to be measured in the prior art, so that approximately one fifth of the time required for the AFM measurement in the prior art is needed, which largely reduces the measurement time. Further, the surface shape (height) of the line at the left side of the X axis is measured with the AFM, to significantly reduce the influence of the distance change due to the thermal drift resulting from the temperature change, or the distance change caused by the creep of an actuator of a piezoelectric element during the MFM measurement. Moreover, in the embodiment of FIG. 4, one line (100 points) along the X axis is scanned, and the scanning operation may also be performed every odd-numbered lines or every n lines (n is an integer). In addition, 100 points in a diagonal (tilting) direction of the scanning area shown in FIG. 4 may also be scanned, and the measurement result is applied.

Figure 5:
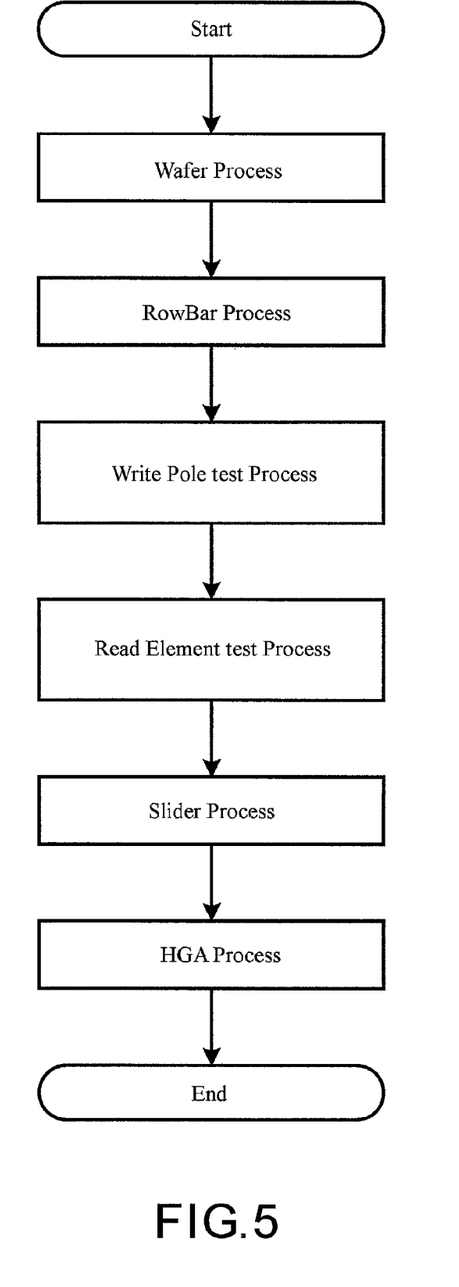
FIG. 5 is a chart illustrating an example of a magnetic head manufacturing process including an inspection process of a write pole using an AFM and an MFM of the present invention.

FIG. 5 is a chart illustrating an example of a magnetic head manufacturing process including an inspection process of a write pole using an MFM of the present invention. Referring to FIG. 5, in the wafer process, film deposition, etching, cleaning, and other semiconductor like processes are performed. In the row-bar process, a strip-shaped row-bar is diced from a wafer, and lapping, air bearing surface (ABS) formation, cleaning, carbon protective film deposition, and other processes are performed on the row-bar. In the write pole test process, the effective track width of the write pole is measured for the strip-shaped row-bar using the AFM and the MFM in FIG. 1. In the read element test process, similarly, electromagnetic conversion characteristics of each read element are measured within the strip-shaped row-bar. In the slider process, the strip-shaped row-bar is diced and each slider is machined into a chip shape, and a cleaning and an inspection process are performed. In the HGA process, a magnetic head slider already machined into the chip shape is connected to a suspension, and a cleaning process and an inspection process are performed. Afterwards, the HDD processes (head stack assembly (HSA) process and head disk assembly (HDA) process) (not shown) are performed. According to this embodiment, a good-or-bad determination may be performed on the effective track width of the write pole in the row-bar shape, thereby improving the productivity and enabling early feedback on previous processes.

Figure 6:
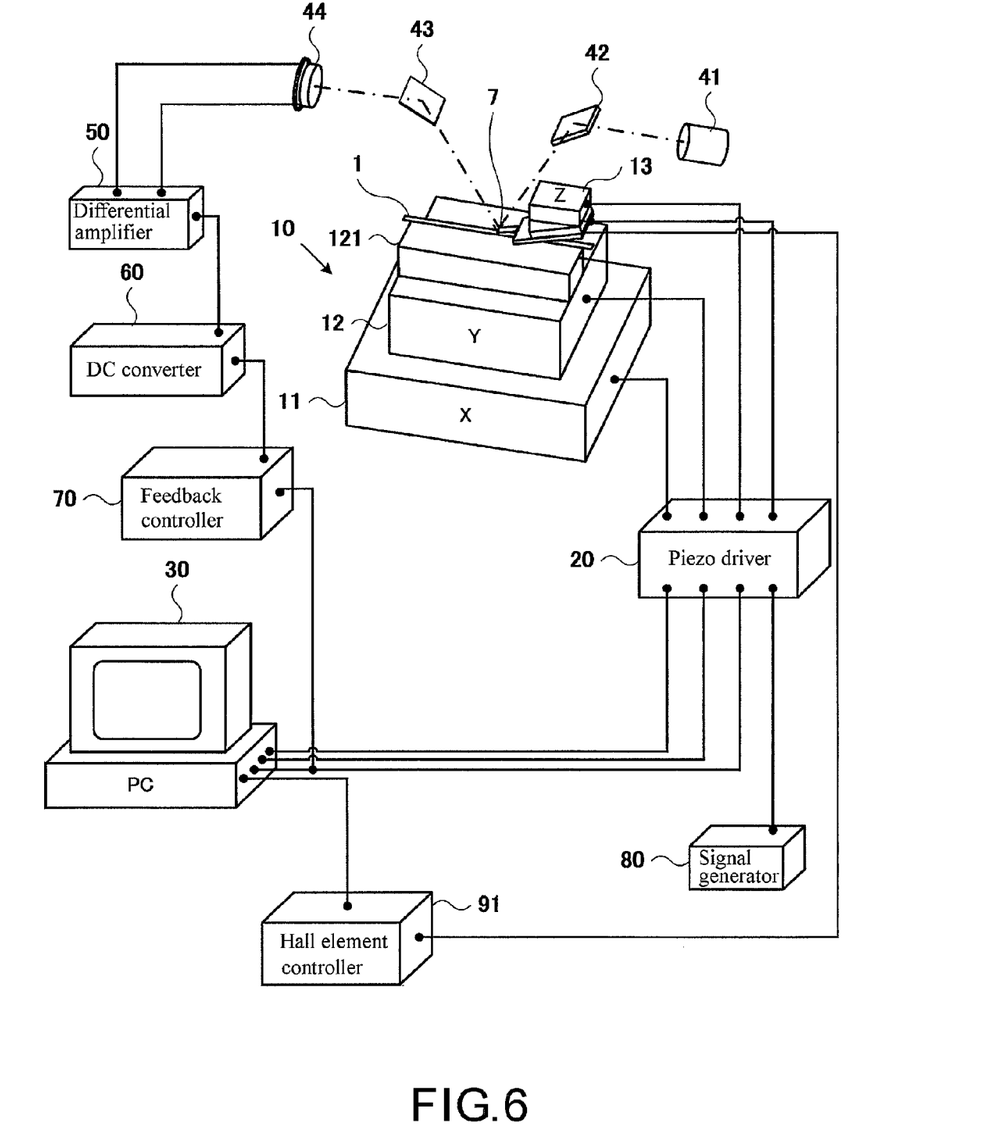
FIG. 6 is a schematic view of a magnetic head inspection device in another embodiment of the present invention.
Figure 7:
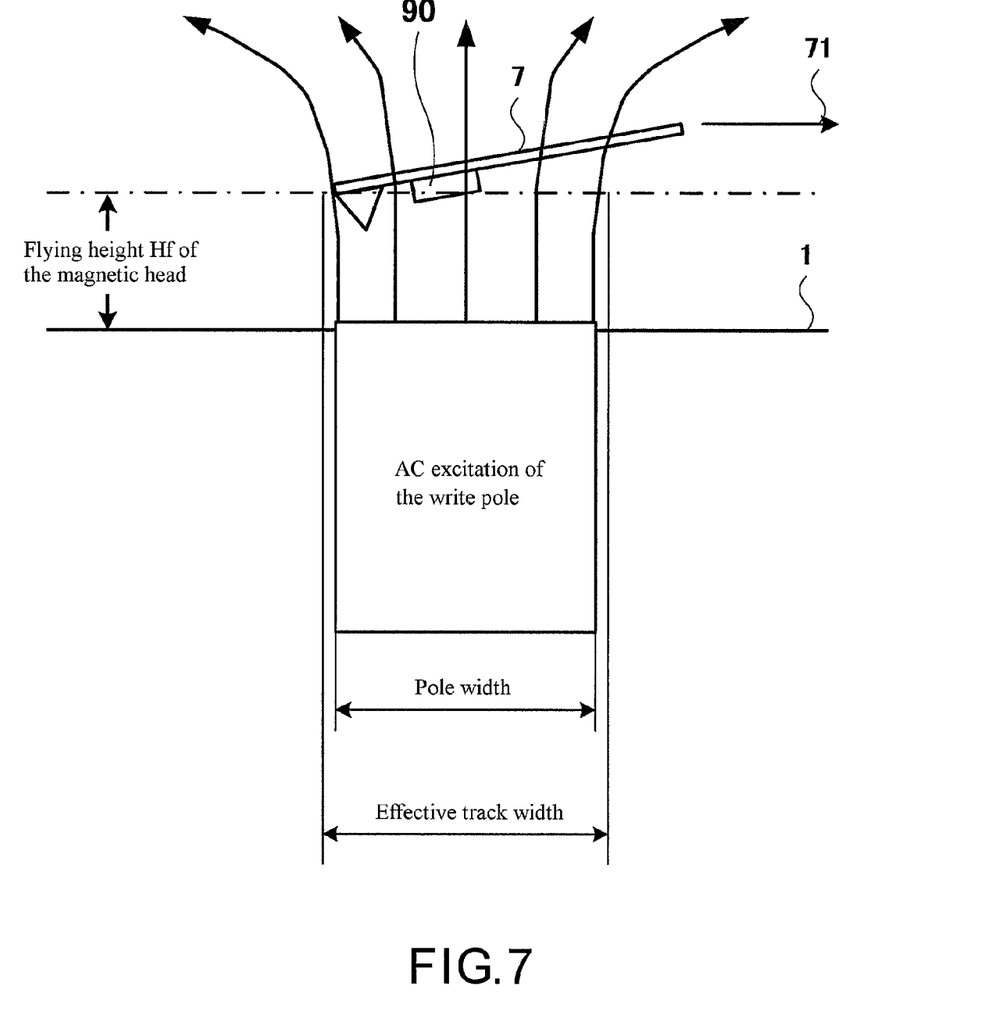
FIG. 7 is a schematic view illustrating an inspection mode of the magnetic head inspection device in FIG. 6 and is a schematic enlarged view illustrating the construction of the magnetic head portion.

FIG. 6 is a schematic view of a construction of a magnetic head inspection device in another embodiment of the present invention. In FIG. 6, like symbols are used to indicate parts having the same constitution as those in FIG. 2, and thus descriptions thereof are omitted. FIG. 7 is a schematic view illustrating an inspection mode of the magnetic head inspection device in FIG. 5 and is a schematic enlarged view illustrating the construction of the magnetic head portion. The difference between the magnetic head inspection device in FIG. 6 and FIG. 7 and that in FIG. 2, FIG. 3(A), and FIG. 3(B) lies in that, a Hall element 90 is mounted on the cantilever portion 7, and the shape of the magnetic field (an absolute value of the magnetic field) generated by the magnetic head is directly measured, so that an effective magnetic track width can be measured. That is, the magnetic head inspection device in FIG. 6 is characterized in an SHPM that makes the Hall element 90 infinitely close to the magnetic material to be observed so as to detect and visualize the magnetic field. The Hall element 90 is formed by patterning a GaAs/AlGaAs epitaxial wafer through photolithography. A Hall element controller 91 provides a current to terminals of the Hall element 90. The Hall element controller 91 adopts a nanovolt meter or other meters to measure the Hall voltage generated between the other terminals of the Hall element 90, and outputs the measured Hall voltage to the control portion 30. A PC of the control portion 30 makes a two-dimensional distribution of surface magnetic field emission according to the Hall voltage, and measures the effective track width of the magnetic head according to the two-dimensional distribution.

Instead of the Hall element 90 being installed on the cantilever portion 7 of the magnetic head inspection device in FIG. 6 and FIG. 7, an MR sensor element may also be installed at the front end portion of the cantilever portion 7, so as to apply an SMRM in the aforementioned magnetism measurement. At this point, an MR sensor controller may be used to replace the Hall element controller to cope with the above situation. In this manner, the Hall element or MR element can be installed on the cantilever portion 7 of the MFM, so that the SHPM or SMRM is capable of implementing the shape measurement and magnetism measurement (measurement of the effective track width) of the write pole at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A magnetic head inspection method, applied to scan and measure a surface shape of a recording portion of a magnetic head in a row-bar state diced from a wafer by using an atomic force microscope (AFM), and based on the measurement result, in a state of maintaining a magnetic probe in a cantilever unit of a magnetic force microscope (MFM) at a position away from the surface of the recording portion of the magnetic head by a distance equivalent to a flying height of the magnetic head relative to a magnetic disk, enable the magnetic probe to scan and move along a surface of a write pole portion of the magnetic head, so as to detect a signal representing an oscillation state of the cantilever unit, and measure an effective track width of the magnetic head based on the signal, the method comprising:

setting an area smaller than a half of a scanning and measurement area of the magnetic probe in the cantilever unit of the MFM as a scanning and measurement area on the surface of the recording portion of the magnetic head that is scanned by the AFM.

2. The magnetic head inspection method according to claim 1, wherein when the scanning and measurement area of the magnetic probe in the cantilever unit of the MFM is rectangular, the scanning and measurement area on the surface of the recording portion of the magnetic head that is scanned by the AFM is set as areas on two sides adjacent to the rectangular area.

3. A magnetic head inspection method, applied to scan and measure a surface shape of a recording portion of a magnetic head in a row-bar state diced from a wafer by using an atomic force microscope (AFM), and based on the measurement result, in a state of maintaining a Hall element or a magneto resistance (MR) element disposed on a cantilever unit of the AFM at a position away from the surface of the recording portion of the magnetic head by a distance equivalent to a flying height of the magnetic head relative to a magnetic disk, enable the Hall element or the MR element to scan and move along a surface of a write pole portion of the magnetic head, so as to detect a signal from the Hall element or the MR element, and measure an effective track width of the magnetic head based on the signal, the method comprising:

setting an area smaller than a half of a scanning and measurement area of the Hall element or the MR element as a scanning and measurement area on the surface of the recording portion of the magnetic head that is scanned by the AFM.

4. The magnetic head inspection method according to claim 1, wherein when the scanning and measurement area of the Hall element or the MR element is rectangular, the scanning and measurement area on the surface of the recording portion of the magnetic head that is scanned by the AFM is set as areas on two sides adjacent to the rectangular area.

5. A magnetic head manufacturing method, wherein the magnetic head inspection method according to claim 1 is used to manufacture the magnetic head.

6. A magnetic head manufacturing method, wherein the magnetic head inspection method according to claim 2 is used to manufacture the magnetic head.

7. A magnetic head manufacturing method, wherein the magnetic head inspection method according to claim 3 is used to manufacture the magnetic head.

8. A magnetic head manufacturing method, wherein the magnetic head inspection method according to claim 4 is used to manufacture the magnetic head.

* * * * *